No. 657,376. Patented Sept. 4, 1900.
G. WOODS.
GAS GENERATOR.
(Application filed Oct. 30, 1899.)
(No Model.)
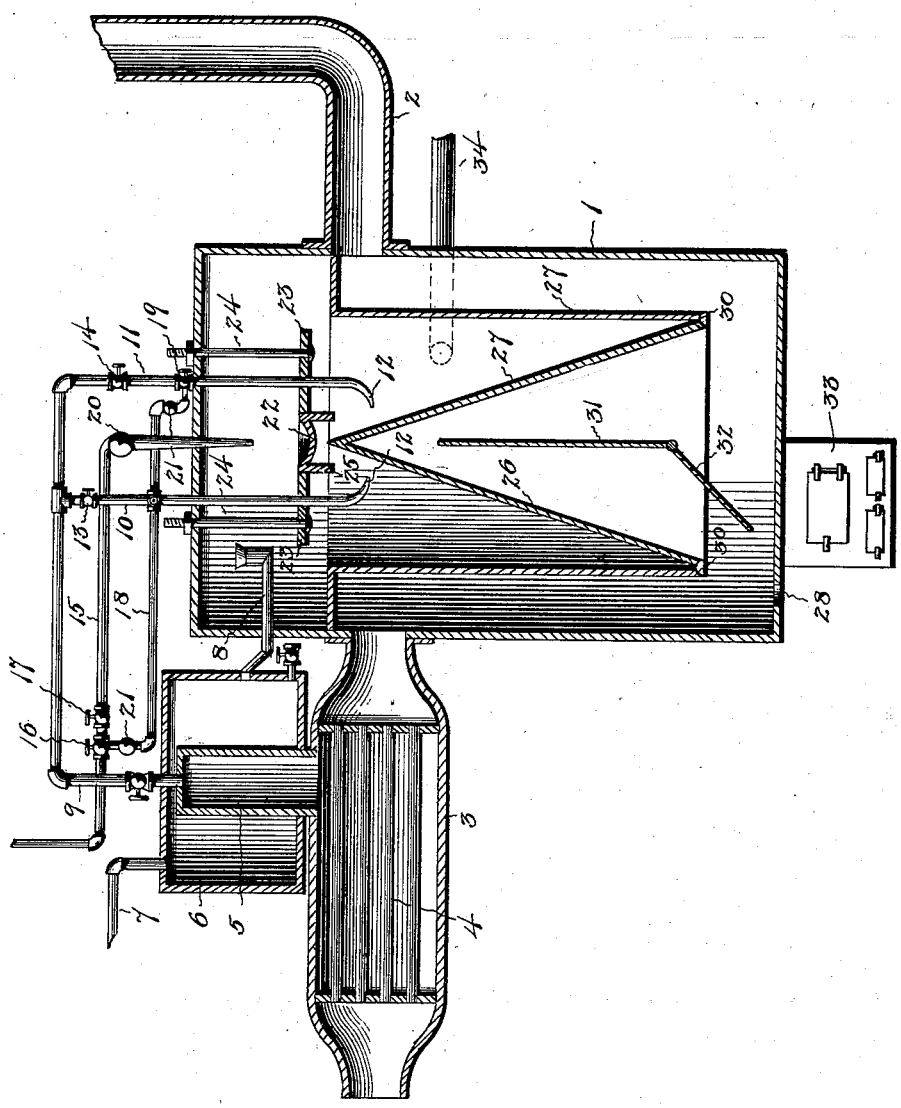
Witnesses
T. L. Mockabee
Fred. D. Bradford.
Inventor
Grant Woods
By L. Deane & Son
Attorneys

UNITED STATES PATENT OFFICE.

GRANT WOODS, OF BAKERSFIELD, CALIFORNIA, ASSIGNOR TO MATTIE TRULLINGER, OF SAME PLACE.

GAS-GENERATOR.

SPECIFICATION forming part of Letters Patent No. 657,376, dated September 4, 1900.

Application filed October 30, 1899. Serial No. 735,207. (No model.)

*To all whom it may concern:*

Be it known that I, GRANT WOODS, a citizen of the United States, residing at Bakersfield, in the county of Kern and State of California, have invented certain new and useful Improvements in Gas-Generators, of which the following is a specification, reference being had therein to the accompanying drawing.

My invention relates to gas-generators for generating gas from crude oils or from oil and steam combined.

The primary object of the invention is to provide a gas-generating apparatus adapted for use in connection with a gas-engine, but capable also of general use for generating gas.

The construction of the apparatus will be fully described hereinafter in connection with the accompanying drawing and its novel features defined in the appended claims.

The drawing represents a central vertical section of an apparatus embodying the invention.

The reference-numeral 1 designates a tank or casing provided with a flue 2 and communicating with a boiler 3, provided with longitudinal flues 4 and a steam-dome 5, which latter extends up within a storage-tank and superheater 6, provided with an outlet-pipe 7 and a gas-inlet pipe 8, which extends through the wall of the tank 1.

9 designates a pipe leading from the steam-dome provided with parallel depending extensions 10 and 11, terminating in jets 12 and with regulating-cocks 13 and 14.

An oil-supply pipe 15, provided with cocks 16 and 17 and downwardly turned at its end, extends centrally through the cover of the tank 1 between the steam-pipes 10 and 11. A branch pipe 18 leads from the oil-pipe 15 to the steam-pipes 10 and 11, being controlled by cocks or valves 19. At the points 20 and 21 glass globes or sections of glass pipe are arranged in the oil-pipes 15 and 18 to permit the operator to observe the feed or flow of the oil.

Below the oil-inlet pipe a trough 22 is suspended within the tank 1 by means of arms 23, projecting from opposite sides of the trough, and bolts 24, projecting through the cover of the tank and adapted to adjust the trough vertically. The edges 25 of the trough are turned down to prevent the oil from running under the trough and feeding irregularly to the plates below it.

26 and 27 designate the oil-receiving plates of the apparatus, which constitute the leading feature of the invention. These plates, as clearly shown in the drawing, are inclined in opposite directions to present inclined surfaces upon which the oil drops, the residuum or waste matter being deflected to the bottom of the tank for discharge through a suitable outlet 28. These plates 26 and 27 are surrounded by a shield or casing 29, supported within the tank 1 concentric therewith. The lower ends of the plates 26 and 27 are connected to the lower end of the casing 29, and discharge-openings 30 are provided for the escape of the residuum of the oil.

A vertically-arranged plate 31 extends across the tank 1 between the plates 26 and 27, and to the lower end of said plate is pivoted a damper 32.

A furnace 33 is arranged below the tank 1 to heat the latter when the heating is not effected by the exhaust from an engine. A pipe 34 leads from the tank 1 to an engine or other consumer of the gas.

The operation of the apparatus will be readily understood and may be explained as follows: Supposing the generator to be heated by the furnace 33, the products of combustion passing around the plate 31 on their way to the flue 2 heat the generator-plates 26 and 27. The oil fed through the pipe 15 descends into and overflows the trough 22, falling upon the heated plates, down which it gravitates in a thin film and is vaporized before passing in the form of a gas to a motor or the like through the pipe 34. Ordinarily, however, the generator is intended to be heated by the exhaust-steam from an engine. When thus used, the exhaust-steam passes through the tubes of the boiler 3, into the casing 1, around the plate 31 to heat the generator-plates, and finally escapes through the flue 2. The passage of the steam through the boiler generates steam therein to supply the dome 5, which constitutes the heater for the superheater and supplies the steam for the jets directed against the generator-plates and designed to commingle with the oil as it descends upon the plates from the trough. The generator-plates convert the oil and steam into gas, which then passes to the superheater, where its tension is increased by contact with the steam-dome. If the enrichment of the steam-jets is desired, the cocks 19 are opened to permit the flow of oil to the steam-pipes. If a greater fall is desired for the oil to increase its diffusion over the plates or for any other reason, the trough is adjusted to a greater elevation. Thus it will appear that the advance circulation of steam after being commingled with oil to form a gas is superheated by a heater supplied by the less-advanced circulation, effecting a great economy by the utilization of gas-making steam to superheat the gas.

I claim—

1. In a gas-generator the combination with a generator-casing, inclined generator-plates therein converging at their upper ends, and means for heating said plates, of means for delivering oil to said plates near their apex, and separate means for directing steam-jets against the surface of the plates.

2. In a gas-generator the combination with a generator-casing, inclined generator-plates converging at their upper ends, a vertically-disposed plate between said plates and heating means, of an oil-trough above the plates, means for supplying oil thereto, and means for directing steam-jets against the plates.

3. In a gas-generator the combination with a generator-casing, inclined generator-plates converging at their upper edges, an adjustable oil-trough above the plates, and means for supplying oil thereto, of means for directing steam-jets laterally against the plates, means for adjusting the trough, and means for enriching the steam-jets with oil.

4. In a gas-generator the combination with a generator-casing, generator-plates therein, means for heating said plates, and means for supplying oil to the plates, of a superheater in communication with the casing, a steam-dome within the superheater, and a steam-pipe leading from said dome to the interior of the casing and into proximity to the generator-plates.

5. In a gas-generator the combination with a generator-casing, inclined generator-plates therein, means for supplying oil thereto, and a superheater in communication with the casing, of a boiler having its dome located within the superheater, means for leading a heating agent through the boiler and into contact with the plates within the casing, steam-pipes having jet-nozzles in proximity to the plates, and means for leading gas from the superheater.

6. In a gas-generator the combination with a generator-casing, an interior casing having an open bottom, and generator-plates extending from the lower edge of the interior casing and converging at its top, of a vertical plate intermediate of the generator-plates, a movable damper below the vertical plate, a boiler having its flue leading into the generator-casing, a flue leading from the opposite side of said casing, a superheater surrounding the dome of the boiler and in communication with the generating-chamber, a trough located above the generator-plates, a steam-pipe in communication with the dome and provided with jet-nozzles in proximity to the plates, and means for leading oil to the steam-pipes.

7. In a gas-generator the combination with a generator-casing, generator-plates therein, and means for supplying oil to the plates, of a superheater in communication with the casing, a boiler having its dome located in the superheater, means for leading steam from the dome to the casing, means for leading a heating agent through the boiler and into contact with the generator-plates and a heater located below the casing.

In testimony whereof I affix my signature in presence of two witnesses.

GRANT WOODS.

Witnesses:
R. B. SWAYNE,
F. B. DAVIS.